Jan. 28, 1958   A. K. STRANDBERG   2,821,380
SPRING GROUP
Filed Oct. 28, 1953
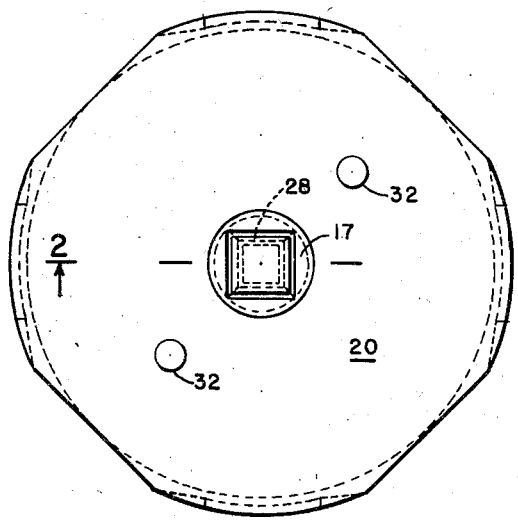
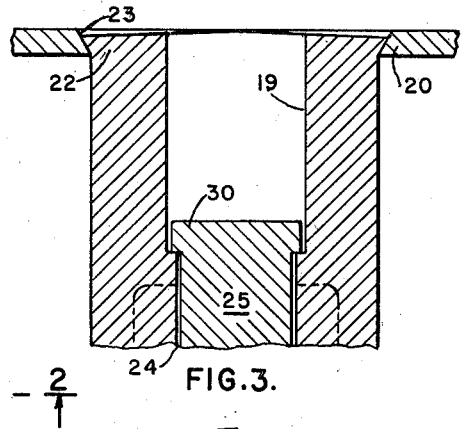
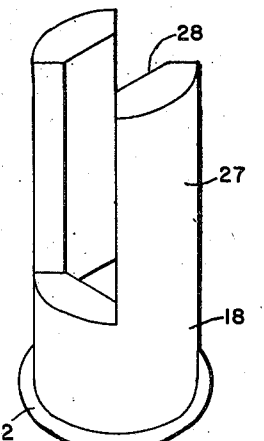
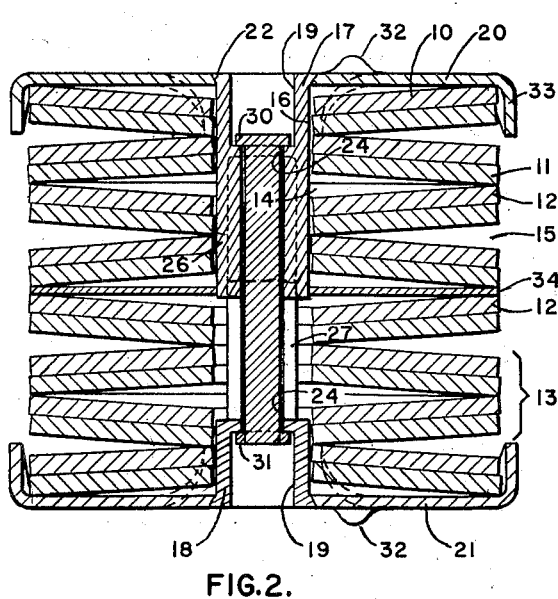
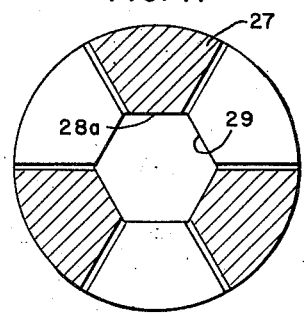
ALBIN K. STRANDBERG,
INVENTOR.
BY *Maurice W. Jacoby*
ATTORNEY.

United States Patent Office
2,821,380
Patented Jan. 28, 1958

2,821,380

SPRING GROUP

Albin K. Strandberg, Latrobe, Pa., assignor to Alco Products, Incorporated, New York, N. Y., a corporation of New York Application October 28, 1953, Serial No. 388,791

4 Claims. (Cl. 267—2)

This invention relates to a spring suspension and more particularly to a spring suspension or snubber unit for vehicles and the like, especially for use in railroad car trucks.

One of the objects of the invention is the provision of a new and improved disc or washer spring unit of stacked uniform discs for use in a spring suspension for resiliently supporting vehicle bodies in such manner that satisfactory riding qualities ensue due to friction between the discs resulting in a desirable snubbing action.

A further object is to provide a spring suspension which uses fewer and larger washers than heretofore and uses only one spring suspension unit where heretofore plural spring suspensions were necessary.

Another object is to provide an arrangement wherein the plates between which the spring suspension is normally placed are part of the suspension itself to make a package unit.

Still another object is to provide a spring suspension which uses a square or any polygonal center pin and corresponding lug hole construction to eliminate twisting of the lugs relative to each other under load and to provide a sliding bearing support for the whole center construction.

And yet another object is to provide a spring suspension in which a bearing plate is used between the middle washer groups to stabilize the entire stack against lateral forces and prevent buckling of the stack of washers.

A further object is to provide a spring suspension which provides a loose joint between the center lugs and plates to allow for the slight relative movement between the top bolster and lower spring plank in a railroad vehicle truck.

Other and further objects of the present invention will be apparent from the following description, the accompanying drawings, and the appended claims.

In the drawings:

Fig. 1 is a top plan view of the spring suspension unit;

Fig. 2 is a cross section taken on line 2—2 of Fig. 1;

Fig. 3 is an enlarged detail of the center jaw lug construction;

Fig. 4 is an enlarged perspective of one of the jaw lugs; and

Fig. 5 is a cross section of a modified lug construction.

Referring now to the drawing, the spring assembly comprises a plurality of uniform Belleville washers or springs 10 arranged in nested groups 11 and 12 with the concave sides of alternate groups facing in opposite directions. Each group is illustrated as consisting of two washers, although it is to be understood that a greater number can be used if desired. A pair of groups shall be refrerred to hereinafter as a "segment." Reference number 13 indicates a segment. A double convex space 14 between opposite groups provides clearance for the resilient movement of the washers forming each segment. A peripheral space 15 is formed between the segments to afford a clearance for the resilient movement of the washers forming the segments.

The washers are preferably of the same diameter and thickness, and are formed with central apertures so that when stacked, an axial opening 16 extends through the assembly for the reception of jaw lugs 17 and 18 therein. Each jaw lug has an inwardly extending recess 19 that is illustrated in Fig. 1 as square in cross section. Recess 19 should preferably be polygonal although any non-circular shape will suffice.

Top and bottom spring plates 20 and 21 enclose the stack of washers to form a packaged unit. The center of each plate has an opening in which the jaw lugs 17 and 18 are disposed. The jaw lugs may be secured to the plates by any suitable means as in Fig. 2, or they may have a loose fit therein, as shown in Fig. 3. In Fig. 3, head portion 22 of the lug is shown as crowned and having a tapered periphery for seating in countersunk hole 23 in plate 20. The latter construction permits some relative lateral movement between plates 20 and 21.

Each of the jaw lugs 17 and 18 has a polygonal shaped hole 24 therein of smaller dimension than the dimension of recess 19 to permit a working or sliding fit with a corresponding shaped pin 25. The dimensions of the corresponding parts of the hole and pin are such that only small clearance is allowed therebetween so that rotation of the pin relative to the lugs is prevented. Any side thrust and twisting action of the lugs relative to each other and their consequent wear is thus eliminated. Also there is thus provided a sliding bearing support for the whole center construction.

To hold the spring washers in vertical alignment, fingers 26 and 27 are provided on lugs 17 and 18 respectively. Fingers 26 extend downwardly from lug 17 and are designed to be intercalated with upstanding fingers 27 on lug 18. Fingers 26 and 27 are each in the form of a segment of a cylinder and, when assembled, constitute a segmented cylinder having a diameter substantially equal to the diameter of axial opening 16. Each finger has a flat inner surface 28 so that when the two lugs are in assembled position a square hole is provided to correspond to square shanked pin 25 in the illustrative embodiment of Figs. 1–4. The fingers are of such length that maximum spring compression is permitted when the unit is subjected to full load and overlap is provided when the unit is expanded.

A modification of the invention is illustrated in Fig. 5 wherein three fingers 27 are formed in each lug. Each finger has a flat inner surface 28a so that when the lugs are in assembled position a hexagonal hole 29 is provided to correspond to a corresponding hexagonal pin 25. The small working clearance prevents rotation of the pin in the hole, and prevents rotation of the lugs relative to each other.

Pin 25 is formed with a polygonal head 30 to seat in recess 19 of lug 17 and a similar nut 31 is riveted or attached securely by other means to the other end of the pin to permanently position it within recess 19 of lug 18 and thus hold the spring package securely together in expanded position.

A pair of dowel locating means 32 is formed on each plate to align the unit when used in a vehicle truck. Corner flanges 33 may be formed on the plates to enclose the washers 10 as an additional means of securing the unit together. Disposed between the two groups of washers preferably at the center is a center plate 34 which provides individual bearings for the two adjacent groups and thus stabilizes the entire stack.

While there have been hereinbefore described approved embodiments of this invention, it will be understood that many and various changes and modifications in form, arrangement of parts and details of construction thereof may be made without departing from the spirit of the invention, and that all such changes and modifications as fall within the scope of the appended claims are contemplated as a part of this invention.

What I claim is:

1. A spring disc assembly having parallel end plates; a stack of uniform washer discs disposed between the end plates and having an axial opening normal to the end plates; and means extending through said axial opening to connect said plates comprising opposed jaw lugs projecting axially inwardly from each plate, each lug having an outwardly opening polygonal recess therein and a smaller correspondingly shaped axial hole therethrough opening into the recess, inwardly directed peripherally spaced guiding members on each lug, said guiding members being disposed in intercalated sliding relation with each other and defining an axial hole polygonal in cross section to correspond to the cross sectional shape of the axial holes in the lugs, and a pin of corresponding polygonal cross section extending in a sliding fit through the axial hole defined by the guiding members and the axial holes in the lugs to prevent rotation between the lugs, said pin having polygonal shaped end means thereon disposed in the recesses to limit the outward movement of the lugs.

2. A spring disc assembly having parallel end plates; a stack of uniform washer discs disposed between the end plates and having a central axial opening normal to said end plates; and means extending through said discs to connect the end plates comprising opposed circular jaw lugs projecting inwardly from each plate through the central opening in the washers and in sliding relation therewith, each lug having an outwardly opening square recess therein and a smaller square axial hole therethrough opening into the recess; inwardly directed peripherally spaced guiding members on each lug, said guiding members being disposed in intercalated sliding relation with each other and defining a hole square in cross section; and a connecting pin having a square cross section extending in a sliding fit through the axial hole defined by the guiding members and the axial holes in the lugs to prevent rotation between the lugs, said pin having square end means thereon disposed in close sliding fit in the recesses to limit the outward movement of the lugs.

3. A spring disc assembly having opposed end plates; a stack of uniform washer discs disposed between said plates; and means extending through the washers connecting said plates comprising opposed jaw lugs projecting one from each plate, each of said lugs having an axial aperture therein and having fingers extending toward the opposite plate, the fingers of the lugs being disposed in intercalated sliding engagement and defining a noncircular hole coaxial with the jaw lug apertures, and a pin having the same non-circular shape as the hole defined by the fingers, said pin extending through the jaw lug apertures into a sliding fit with the hole defined by the fingers to connect the jaw lugs together and to prevent rotation of the pin relative to the lugs.

4. A spring disc assembly having opposed end plates; a stack of uniform washer discs disposed between said plates in centered relation therewith; and means extending through the washers for connecting said plates comprising opposed jaw lugs projecting inwardly one from each plate and having guiding members extending toward the other plate, said jaw lugs each having a polygonal axial hole therethrough, the guiding members being disposed in intercalated sliding engagement and defining a polygonal hole coaxial with the jaw lug holes, a pin of corresponding polygonal cross section extending in a sliding fit through the jaw lug holes and the hole defined by the guiding members to connect the jaw lugs together, the sliding fit arrangement of the pin through the holes being such that rotation of the pin relative to the lugs is prevented, and means on the pin connected with said lugs to limit the outward movement thereof.

References Cited in the file of this patent

UNITED STATES PATENTS

| 65,790 | Belleville | June 18, 1867 |
| 1,460,580 | Haselfine | July 3, 1923 |
| 1,818,362 | Symington | Aug. 11, 1931 |
| 1,840,506 | Hankins | Jan. 12, 1932 |
| 2,387,266 | Holland | Oct. 23, 1945 |
| 2,466,094 | Frost | Apr. 5, 1949 |
| 2,486,556 | Dath | Nov. 1, 1949 |
| 2,565,108 | Zahodiakin | Aug. 21, 1951 |